(12) United States Patent
Finnerty et al.

(10) Patent No.: US 9,774,055 B2
(45) Date of Patent: Sep. 26, 2017

(54) TUBULAR SOLID OXIDE FUEL CELL ASSEMBLY AND FUEL CELL DEVICE INCORPORATING SAME

(75) Inventors: Caine Finnerty, Port Washington, NY (US); Paul DeWald, Glen Cove, NY (US)

(73) Assignees: WATT FUEL CELL CORP., Port Washington, NY (US); WATT AGENT, LLC, Philadelphia, PA (US)

( * ) Notice: Subject to any disclaimer, the term of this patent is extended or adjusted under 35 U.S.C. 154(b) by 1254 days.

(21) Appl. No.: 13/409,318

(22) Filed: Mar. 1, 2012

(65) Prior Publication Data

US 2013/0230787 A1    Sep. 5, 2013

(51) Int. Cl.
| | |
|---|---|
| *H01M 8/24* | (2016.01) |
| *H01M 8/04* | (2016.01) |
| *H01M 8/243* | (2016.01) |
| *H01M 8/0252* | (2016.01) |
| *H01M 8/04014* | (2016.01) |
| *H01M 8/124* | (2016.01) |

(52) U.S. Cl.
CPC ......... *H01M 8/243* (2013.01); *H01M 8/0252* (2013.01); *H01M 8/04014* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 6,379,831 B1 | 4/2002 | Draper et al. | |
| 7,767,329 B2 | 8/2010 | Crumm et al. | |
| 8,343,689 B2 | 1/2013 | Crumm et al. | |
| 8,389,180 B2 | 3/2013 | Hawkes et al. | |
| 2008/0063916 A1 | 3/2008 | Hawkes et al. | |
| 2009/0087714 A1 | 4/2009 | Hama et al. | |
| 2012/0015276 A1 | 1/2012 | Soh et al. | |
| 2012/0015278 A1 | 1/2012 | Yoon et al. | |
| 2012/0122007 A1 | 5/2012 | Kuehn et al. | |
| 2014/0030626 A1 | 1/2014 | Soh et al. | |

FOREIGN PATENT DOCUMENTS

| | | |
|---|---|---|
| JP | 2000/182642 A | 6/2000 |
| JP | 2008/166204 A | 7/2008 |
| KR | 20110094448 A | 8/2011 |
| KR | 20120008274 A | 1/2012 |
| RU | 2447545 C2 | 11/2011 |

OTHER PUBLICATIONS

English Translation of JP 2008-166204.*
Russian Search Report Mailed Dec. 7, 2015.
International Search Report and Written Opinion dated Jun. 26, 2013.

* cited by examiner

*Primary Examiner* — Ula C Ruddock
*Assistant Examiner* — Frank Chernow
(74) *Attorney, Agent, or Firm* — Dilworth & Barrese, LLP.; Michael J. Musella, Esq.

(57) ABSTRACT

A tubular solid oxide fuel cell assembly includes at least two tubular solid oxide fuel cell units, at least one shared current collector and a retainer for retaining a section of the fuel cell units and shared current collector in close fitting relationship therewith.

22 Claims, 9 Drawing Sheets

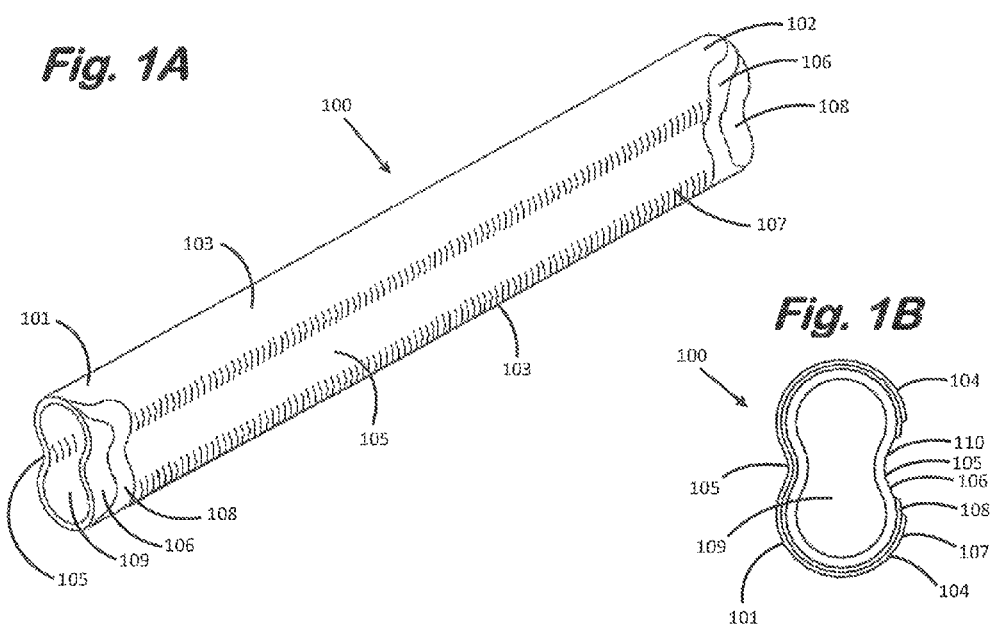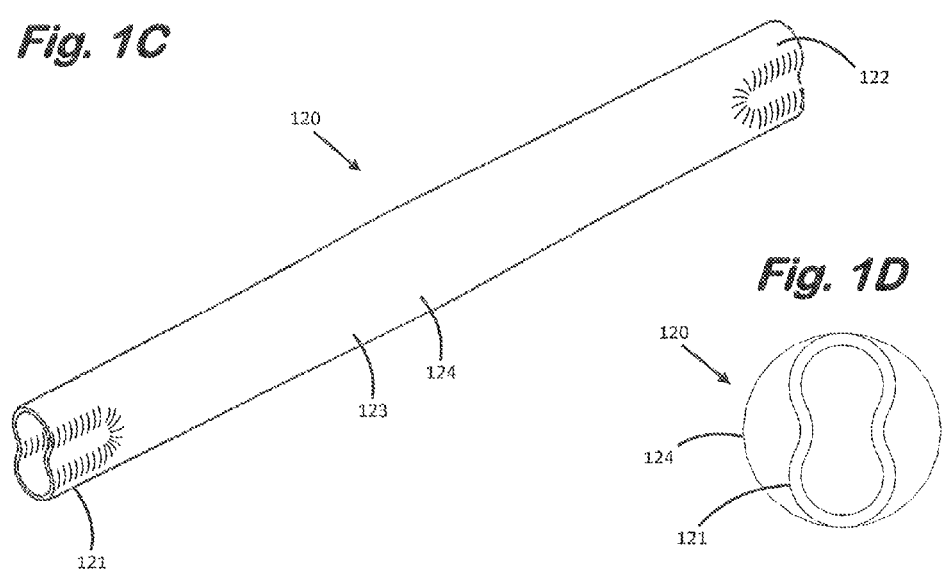

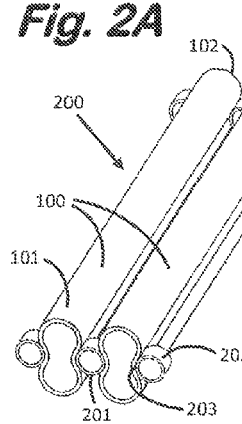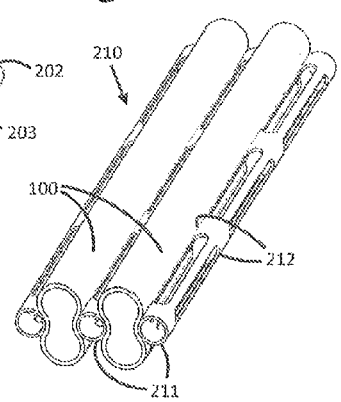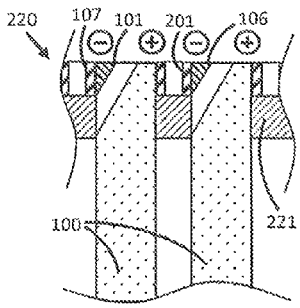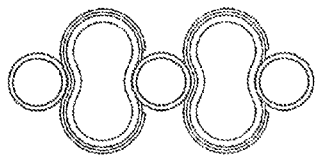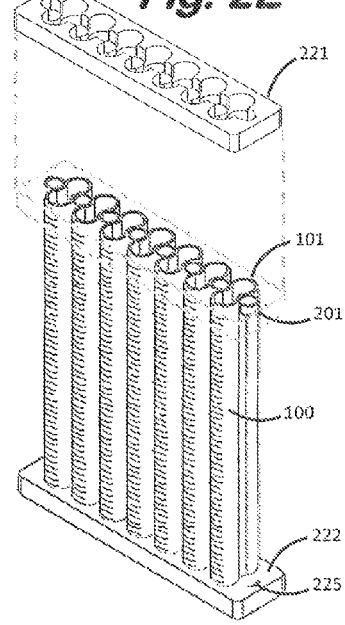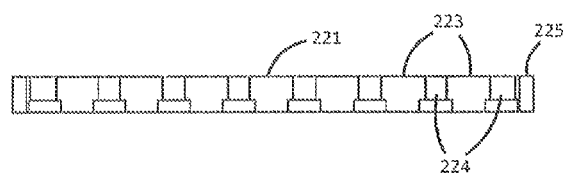

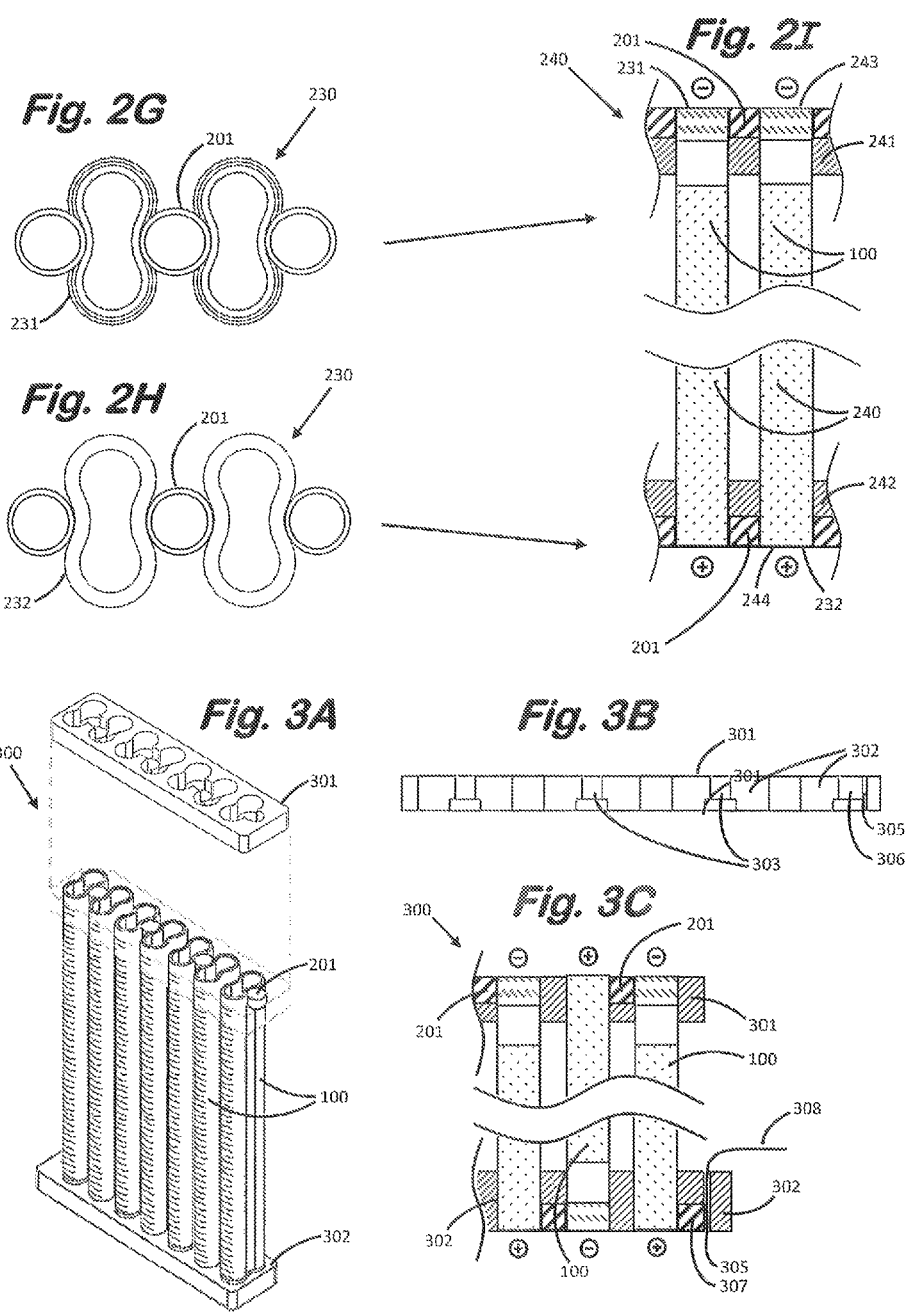

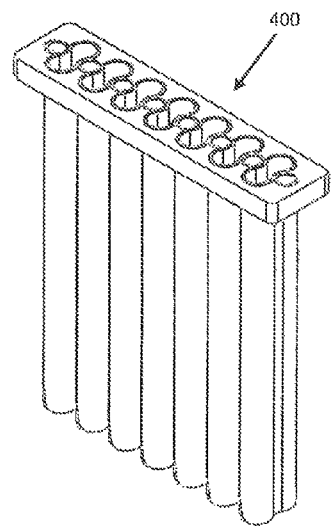
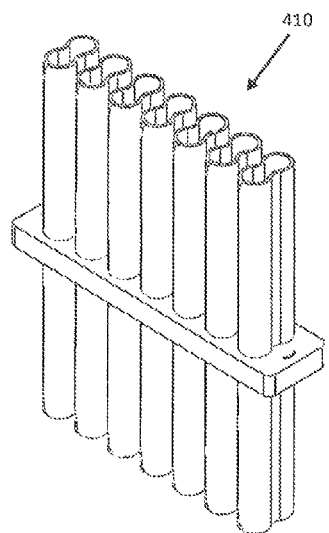
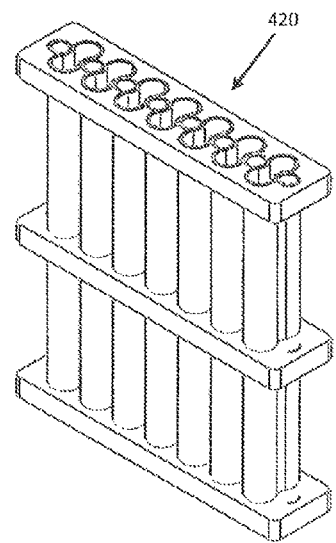
Fig. 4A  Fig. 4B  Fig. 4C
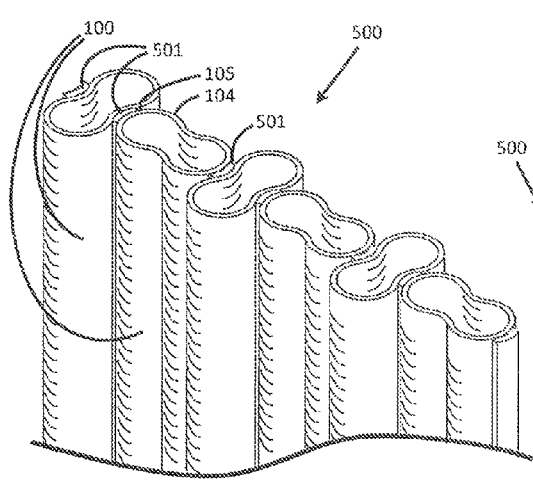
Fig. 5A
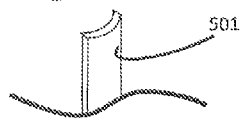
Fig. 5B
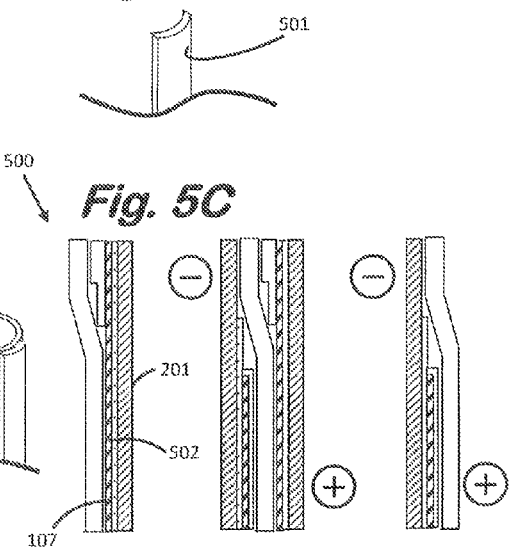
Fig. 5C

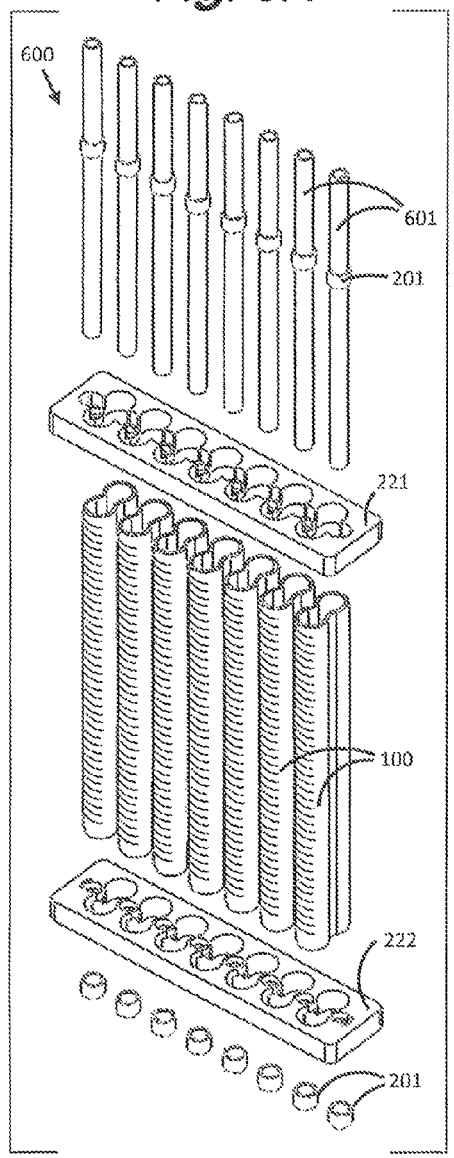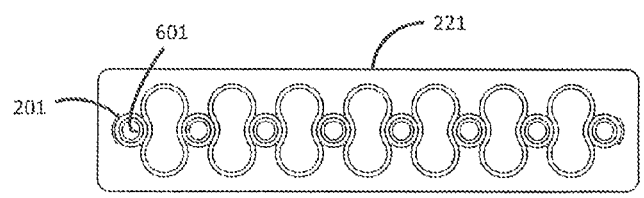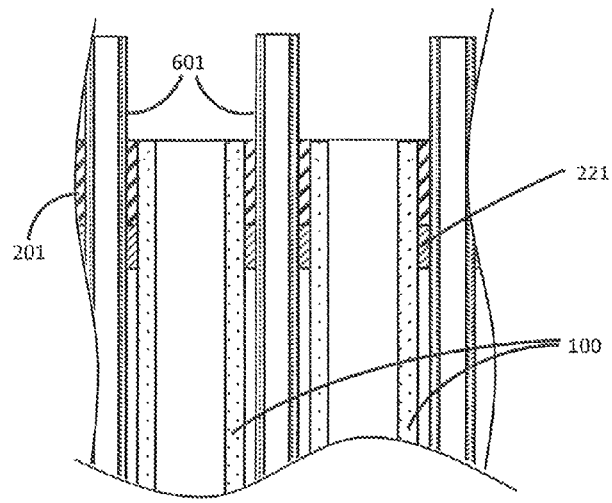

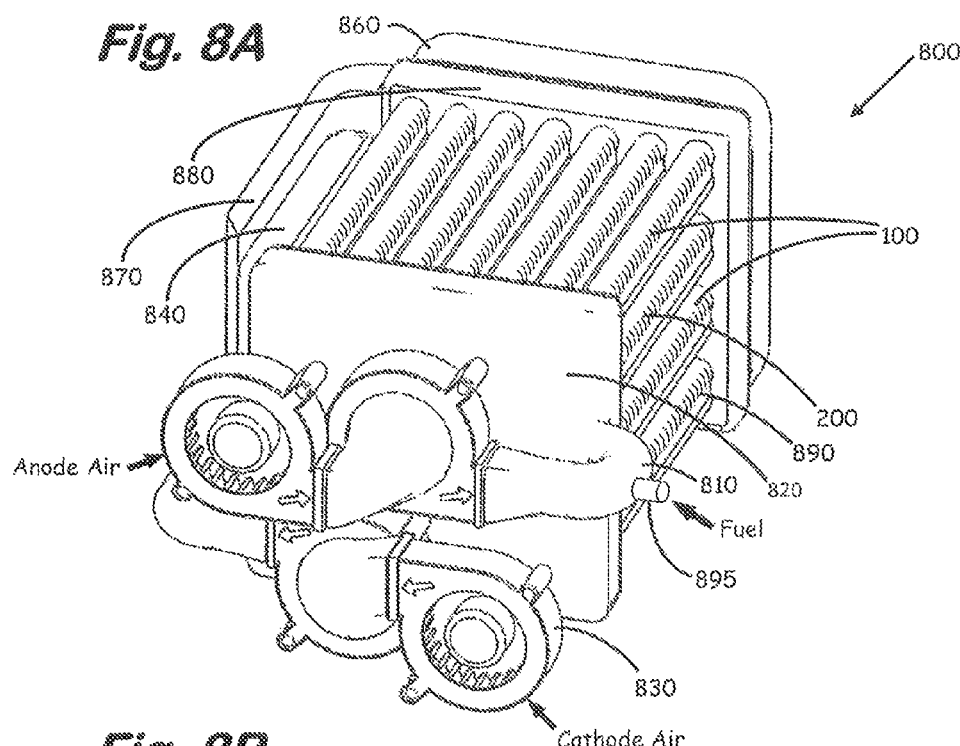
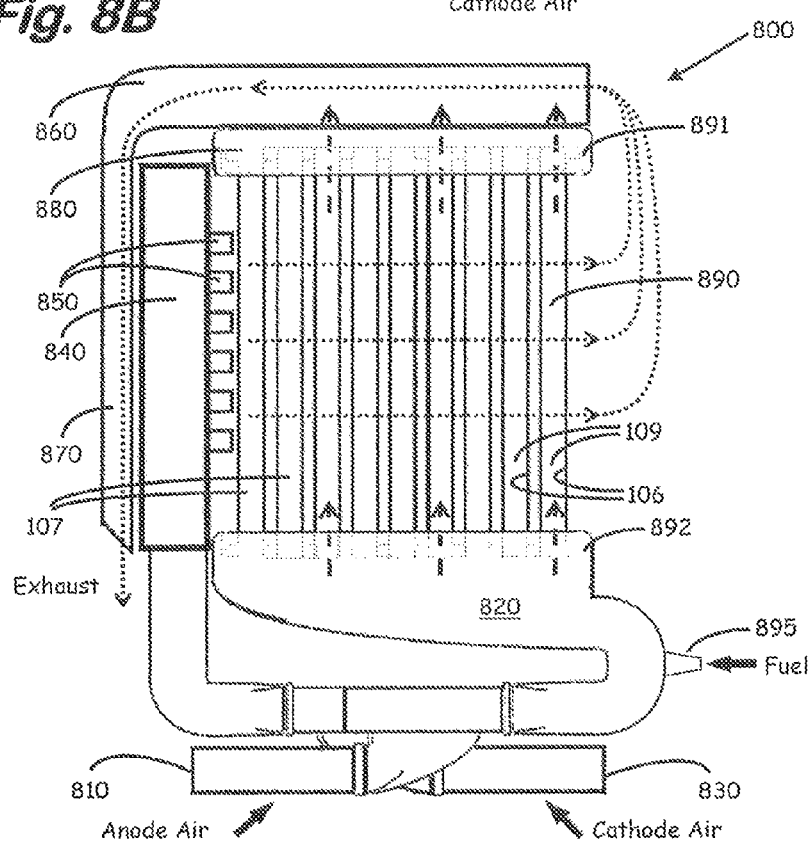

Prior Art - Assembly at 20°C

Prior Art - Assembly at 600—850°C

Prior Art - Assembly at 20°C

Prior Art - Assembly at 600—850°C

TUBULAR SOLID OXIDE FUEL CELL ASSEMBLY AND FUEL CELL DEVICE INCORPORATING SAME

BACKGROUND OF THE INVENTION

This invention relates to fuel cells aid, more particularly, to tubular solid oxide fuel cell assemblies and fuel cell devices incorporating such assemblies.

A fuel cell is an electrical device which converts the energy potential of fuel to electricity through an electrochemical reaction. In general, a fuel cell unit comprises a pair of electrodes (anode and cathode) separated by an electrolyte. The electrolyte permits only the passage of certain types of ions. The selective passage of ions across the electrolyte results in a potential being generated between the two electrodes. This potential can be harnessed to do useful work. This direct conversion process increases the efficiency of power generation by removing mechanical steps required by traditional power generating devices such as internal combustion engine-driven electrical generators. Additionally, the combination of higher efficiency and electrochemical processes provides an energy-efficient, resource-conserving and environmentally sound source of electrical power.

A well known type of solid oxide fuel cell (SOFC) possesses three basic components: an anode layer that generates electrons, a cathode layer that consumes electrons and an intermediate electrolyte layer that conducts ions but prevents electrons from passing. In operation, a fuel such as hydrogen, as hydrocarbon, an alcohol, carbon monoxide or mixture of any of the foregoing combines with oxygen anions within the anode layer to produce water and/or carbon dioxide and electrons. The electrons generated within the anode layer migrate through the external load and back to the cathode layer where oxygen, typically provided as a flow of air, combines with the electrons to provide oxygen anions which selectively pass through the electrolyte layer and into the anode layer.

There are in general three structural types of SOFCs: monolithic SOFCs which possess a honeycomb construction formed by fusing together thin sheets of ceramic material into a monolithic block; tubular SOFCs which as their name indicates possess a tubular, typically cylindral, configuration; and, planar SOFCs which possess a flat, plate-like shape, SOFCs operate at fairly high temperatures, e.g., on the order of 850-1000° C. As a result of these high operating temperatures, planar SOFCs have a tendency to crack and to encounter problems with sealing resulting from thermal cycling. While tubular SOFCs generally perform better in these respects, they may exhibit operational difficulties relating to current collection such as ohmic losses resulting from separation of electrical contact surfaces occurring during operation. Monolithic SOFCs, owing to the large number of small components, layers and interconnections involved in their manufacture, pose heightened concerns for their reliability.

In the particular case of tubular SOFC assemblies and fuel cell devices incorporating them, thermal stresses resulting from on-off cycling can lead to ohmic losses due to the tendency of their current collector components to pull away or separate from the electrodes with which they are associated under operating conditions. The subsequent reduction in the area of electrical contact is due largely to the difference in thermal expansion of the ceramic electrode components of the tubular SOFC assemblies compared with those of their metal or metal-containing current collector components. Mechanical threes resulting from the differential in thermal expansion of the electrodes and current collectors, although individually small, may exert a cumulative effect over time manifested as a permanent significant reduction in area of electrical contact between current collectors and ceramic electrodes and accompanying power-robbing ohmic losses.

A need therefore exists for a tubular SOFC assembly that resists the aforenoted tendency for the current collector components of the assembly to pull away or separate from their associated electrodes during operation.

SUMMARY OF THE INVENTION

In accordance with the present invention, a tubular solid oxide fuel cell assembly is provided which comprises:

a) at least two axially elongate tubular solid oxide fuel cell units sharing at least one external current collector, each fuel cell unit comprising:
   i) first and second end sections and an intermediate section therebetween, and
   ii) an inner electrode layer, an outer electrode layer and an electrolyte layer therebetween;

b) at least one external, shared current collector in electrical contact with an electrode layer of at least two fuel cell units, the current collector possessing a coefficient of thermal expansion greater than that of the fuel cell units, the current collector and each electrode layer in electrical contact therewith possessing substantially conforming electrical contact surfaces; and, c) at least one retainer configured to retain at least one section of at least two fuel cell units and at least a portion of shared current collector in close-fitting relationship therewith, the coefficient of thermal expansion of the retainer being less than or equal to that of the fuel cell units, the portion of the current collector retained within the retainer when thermally expanded placing the electrode surface of each fuel cell unit in electrical contact therewith under compression.

During operation of a fuel cell device incorporating the tubular SOFC assembly of this invention, thermal expansion of a current collector component with its higher coefficient of thermal expansion compared with that of the fuel cell units with which the current collector is in electrical contact results in a compressive force being exerted against the electrical contact surfaces of the electrode layers of the fuel cell units. As a result of this compressive force, the original area of electrical contact between the current collector and its associated electrodes will remain substantially constant even after many on-off cycles of operation thereby eliminating or mitigating ohmic losses in a fuel cell device incorporating the tubular SOFC assembly of this invention.

BRIEF DESCRIPTION OF THE DRAWINGS

In the accompanying drawings in which like reference numerals refer to like elements:

FIG. 1A is a perspective view of one embodiment of tubular SOFC unit in accordance with the invention showing exposed electrode surfaces at both end sections of the unit;

FIG. 1B is an enlarged view of an end section of the tubular SOFC unit of FIG. 1A;

FIG. 1C is a perspective view of another embodiment of tubular SOFC unit in accordance with the invention in which the cross sectional configuration of its end sections differs from that of its intermediate section;

FIG. 1D is an enlarged view of one end of the tubular SOFC unit of FIG. 1C showing the transition of the alternating convex-concave configuration of this end to the generally circular cross sectional configuration of the intermediate section of the fuel cell unit;

FIGS. 2A and 25 are perspective views of pairs of adjacent tubular SOFC units of FIG. 1A illustrating, respectively, annular-shaped current collectors in electrical contact with the end sections of the fuel cell units in the pair, and an apertured tubular-shaped current collector extending substantially the full length of the fuel cell units in the pair;

FIG. 2C is an enlarged end view of the identical end sections of the pair of tubular SOFC units shown in FIG. 2A illustrating the inner anode-to-outer cathode electrical connection of the fuel cell units in the pair by their shared current collectors so as to provide electrical connection of the fuel cell units in series;

FIG. 2D is an enlarged partial longitudinal cross sectional view of a tubular SOFC unit assembly of the invention incorporating a pair of tubular SOFC units as shown in FIGS. 2A and 2C electrically connected in series and illustrating the close-fitting relationship between the end sections of each fuel cell unit in the pair, their shared current collectors and their associated retainers;

FIG. 2E is a perspective, partially exploded view of the tubular SOFC assembly of FIG. 2D with one of its two retainers shown in phantom outline and as separated from the assembly to better show details of its fuel cell section and shared current collector-retaining interior configuration;

FIG. 2F is a longitudinal cross sectional view of the separated retainer shown in FIG. 2E;

FIGS. 2G and 2H are enlarged end views of the pair of tubular SOFC units shown in FIG. 2A illustrating, respectively, the inner anode-to-inner anode electrical connection of the fuel cell units by their shared collector at one end thereof and outer cathode-to-outer cathode electrical connection of the fuel cell units by their shared current collector at the other end thereof so as to provide electrical connection of the fuel cell units in parallel;

FIG. 2I is an enlarged partial longitudinal cross sectional view of a tubular SOFC unit assembly incorporating a pair of tubular SOFC units as shown in FIG. 2A electrically connected in parallel and illustrating the tight-fitting relationship of the end sections of the fuel cell units, their shared current collectors and their associated retainers;

FIG. 3A is a perspective partially exploded view of another embodiment of tubular SOFC assembly of the invention with one of its two retainers shown in phantom outline and as separated from the assembly to better show details of its fuel cell section and shared current collector-retaining interior configuration;

FIG. 3B is a longitudinal cross sectional view of the separated retainer shown in FIG. 3A;

FIG. 3C is an enlarged partial longitudinal cross sectional view of the tubular SOFC assembly of FIG. 3A illustrating the electrical connection of its fuel cell units in alternating single-ended series;

FIGS. 4A, 4B and 4C are perspective views of other embodiments of tubular SOFC assemblies of the invention illustrating the placement of their retainer component(s);

FIG. 5A is a perspective view of another arrangement of fuel cell units in accordance with their invention;

FIG. 5B is a perspective view of a section of the shared current collectors of the arrangement of fuel cell units shown in FIG. 5A, the current collectors possessing the curved parallelogram configuration of the enlarged cross sectional view shown in FIG. 7G;

FIG. 5C is an enlarged partial longitudinal cross sectional view of the arrangement of fuel cell units shown in FIG. 5A;

FIG. 6A is an exploded perspective view of another embodiment of tubular SOFC assembly of the invention possessing cathode air supply tubes disposed in axial alignment with the fuel cell units;

FIGS. 6B and 6C are, respectively, an enlarged plan view and an enlarged partial longitudinal cross sectional view of the tubular SOFC assembly of FIG. 6A showing the retention of a section of the cathode air supply tubes within the annular space of each current collector;

FIGS. 8A and 8B are, respectively, a perspective view and a top view, partly elevational and partly cross sectional, of a fuel cell device incorporating a tubular SOFC assembly in accordance with the invention with air flow being directed through the assembly in a path which initially is generally transverse to the longitudinal axes of the fuel cell units;

DETAILED DESCRIPTION OF THE INVENTION

It is to be understood that the invention herein is net limited to the particular procedures materials and modifications described and as such may vary. It is also to be understood that the terminology used is for purposes of describing particular embodiments only and is not intended to limit the scope of the present invention which will be limited only by the appended claims.

In the specification and claims herein, the following terms and expressions are to be understood as indicated.

The singular forms "a," "an," and "the" include the plural.

All methods described herein may be performed in any suitable order unless otherwise indicated herein or otherwise clearly contradicted by context. The use of any and all examples, or exemplary language provided herein, e.g., "such as", is intended merely to better illuminate the invention and does not pose a limitation on the scope are invention unless otherwise claimed. No language in the specification should be construed as indicating any non-claimed element as essential to the practice of the invention.

As used herein, "comprising," "including," "containing," "characterized by", and grammatical equivalents thereof are inclusive or open-ended terms that do not exclude additional, unrecited elements or method steps, but will also be understood to include the more restrictive terms "consisting of" and "consisting essentially of."

The expression "shared current collector" shall be understood herein to mean a current collector whose electrical contact surfaces make electrical contact with electrical contact surfaces of electrode layers of at least two fuel cell units.

Other than in the working examples or where otherwise indicated, all numbers expressing amounts of materials, reaction conditions, time durations, quantified properties of materials, and so firth, stated in the specification and claims are to be understood as being modified in all instances by the term "about."

The term "ceramic", in addition to its art-recognized meaning, shall be understood herein to include glasses, glass-ceramics and cermets.

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The entire contents of all prior patents, pending applications and other prior publications referred to herein are incorporated by reference.

Figure 7A:
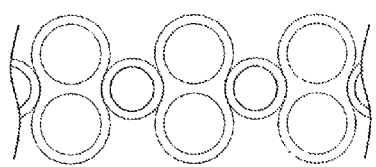
FIGS. 7A-7I are cross sectional views of some arrangements of fuel cell units and their shared current collector(s) in accordance with the invention.
Figure 7B:
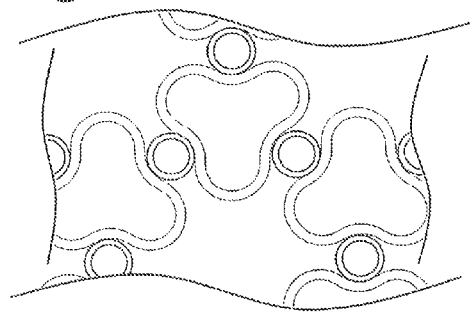
Figure 7C:
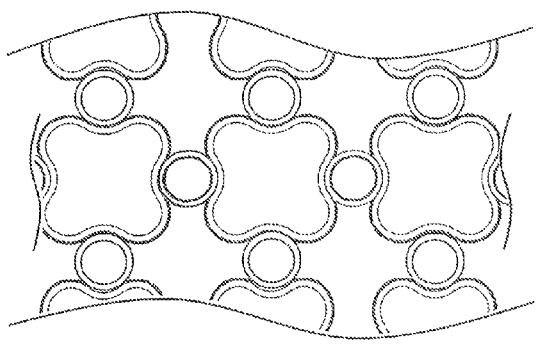
Figures 7D, 7E:
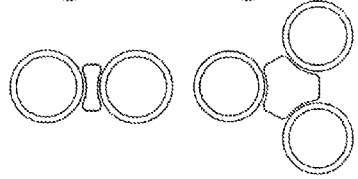
Figure 7G:
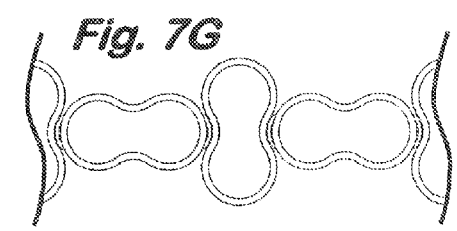
Figure 7F:
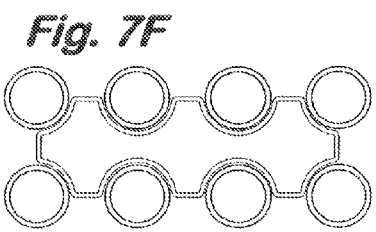
Figure 7H:
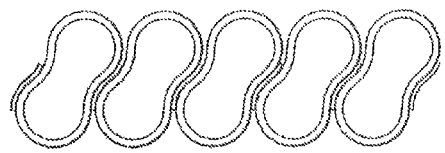
Figure 7I:
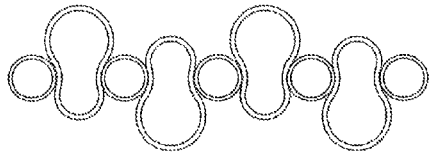

Referring now to the drawings in which like numerals refer to like parts, tubular fuel cell unit 100 of FIGS. 1A and 1B is one of numerous embodiments of tubular fuel cell that can be utilized in the construction of a tubular SOFC assembly in accordance with the invention. Fuel cell unit 100 includes substantially identical first and second end sections 101 and 102, intermediate section 103 and convex surfaces 104 alternating with concave surfaces 105 extending for the full length of the unit. Portions of end sections 101 and 102 of fuel cell unit 100 are shown peeled away to better illustrate the arrangement of its inner anode layer 106, outer cathode layer 107 and intermediate electrolyte layer 108. Bore 109 provides for the flow of fuel through the length of fuel cell unit 100 and contact with inner anode layer 106. While the cross section of fuel cell unit 100 is generally symmetrical it will be understood that this need not be the case as one convex curve can be longer than the other, e.g., as shown in the embodiment of FIG. 7I.

As shown in FIG. 1B, fuel cell unit 100 presents an exposed electrical contact surface 109 of inner anode layer 106 to allow for electrical contact of such surface with a conforming electrical contact surface of an associated current collector as shown in FIGS. 2C and 2B. Exposed electrical contact surface 110 of anode layer 106 can extend for just a portion of the length of concave curve 105 of fuel cell unit 100, e.g., at its first end section 101, its second end section 102 and/or at its intermediate section 103, or such contact surface can extend for up to the full length of concave surface 105, i.e., from the beginning of first end section 101 to the end of second end section 102.

As shown in the embodiment of tubular fuel cell unit of FIG. 1C, fuel cell unit 120 includes identical first and second end sections 121 and 122, presenting much the same cross sectional configuration as that of first and second end sections 101 and 102 of fuel cell unit 100 of FIG. 1A, and a generally circular cross-section 124 at its intermediate section 123. Thus unlike fuel cell unit 100 in which the cross sectional geometry of the unit is essentially uniform for its entire length, the cross sectional geometry of fuel cell unit 120 is non-uniform, i.e., the cross sections of its first end section 121 and identical second end section 122 (not shown) transition into generally circular cross section 124 for the length of its intermediate section 123.

Fuel cell units 100 and 120 and their many variations can be fabricated from known and conventional anode layer-forming, electrolyte layer-forming and cathode-layer forming compositions, e.g., as disclosed in U.S. Pat. Nos. 6,228,521, 6,436,565 and 7,498,095. If desired, one or more additional layers, e.g., an optional electrically conductive layer as in the embodiment of tubular SOFC assembly shown in FIG. 5C herein and/or an optional interfacial layer disposed between the cathode layer and electrolyte layer to reduce polarization losses as described in U.S. Pat. No. 5,993,989 layer, can be provided. The fuel cell units can also be of the internal reforming type, e.g., as described in U.S. Patent Application Publication 2009/0023050.

Tubular fuel cell units 100 and 120 can be fabricated employing one or more known and conventional tubular ceramic structure-forming processes such as extruding, injection molding, gel casting, investment casting, dip-coating, and the like. In the case of fuel cell unit 100 of FIG. 1A and other fuel cell units of continuously uniform cross section, the novel processes for producing tabular ceramic structures described in commonly assigned copending U.S. patent application Ser. Nos. 13/223,349 and 13/223,359, both filed Sep. 1, 2011, are especially advantageous. Among the useful procedures for producing fuel cell unit 120 of FIG. 1D and other fuel cell units of non-uniform cross section are the gel casting molding process of U.S. Pat. No. 5,824,250 which employs a fugitive mold and the ceramic injection molding process of U.S. Pat. No. 6,547,210 which employs a sacrificial insert.

Fuel cell units 100 and 120 are of the internal anode (fuel electrode) supported and external cathode (air electrode) type. However, tubular fuel cell units comprising an internal cathode layer and an external anode layer, and cathode-supported and electrolyte-supported tubular fuel cell unit configurations are also contemplated for construction of a tubular SOFC assembly in accordance with this invention.

As shown in FIG. 2A, single pair 200 of adjacent fuel cell units 100 of FIG. 1A includes shared annular-Shaped current collectors 201 disposed at end sections 101 and 102 of each fuel cell unit in the pair. Convex electrical contact surface 202 of each current collector makes electrical contact with exposed conforming concave electric contact surfaces 203 of electrodes at end sections 101 and 102 of each fuel cell unit.

Single pair 210 of adjacent fuel cell units 100 shown in FIG. 2B is similar to fuel cell pair 200 of FIG. 2A except that in place of the latter's annular-shaped current collectors 201 disposed at end sections 101 and 102 of the fuel cell units, fuel cell pair 210 possesses a single shared current collector 211 extending the full length of the pair. Current collector 211 is advantageously apertured, e.g., with longitudinal slits 212, to allow for better air contact with external cathode layers 107 of both fuel cell units.

As hereinafter more fully described, various electrical connection arrangements can be made for the fuel cell unit components of the tubular SOFC assembly herein.

As shown in FIGS. 2C and 2D, tubular fuel cell pair 200 of FIG. 2A is electrically connected in series, one convex electrical contact surface 202 of shared annular current collector 201 making contact with exposed conforming concave electrical contact surface 203 of inner anode layer 106 and another convex electrical contact surface 202 of current collector 204 making contact with exposed conforming concave electrical contact surface 203 of outer cathode layer 107.

FIG. 2D additionally shows series-connected fuel cell pair 200 of FIG. 2A incorporated into tubular SOFC assembly 220. Retainers 221 and 222 disposed at end sections 201 and 202, respectively, of each fuel cell unit 100 in the pair are configured to retain these end sections and their shared annular-shaped current collectors 201 in close-fitting, e.g. friction-fitted relationship therewith. In FIGS. 2E and 2F, the internal configuration of retainer 221 of tubular SOFC assembly 220 of FIG. 2D is shown in greater detail. Retainer 221 includes passageways 223 for retaining first end section 101 of each fuel cell unit 100 and adjacent recesses 224 for retaining their shared current collectors 201 in the aforementioned. Close-fitting relationship. Slot 225 positioned adjacent to, and in electrical communication with, a non-shared current collector is provided for electrically conductive leads (not shown) to an external load.

The retainer component(s) of the tubular SOFC assembly perform several essential functions. By maintaining one or more sections of the fuel cell units and at least a portion of their shared current collectors in electrical contact therewith in close-fitting relationship, the retainer component(s) immobilize the fuel cell units and their shared current collectors within the assembly and fix their spatial positions relative to each other. In addition, since the current collector component(s) possess a coefficient of thermal expansion (CTE) which is greater than that of their associated, i.e., adjacent, fuel cell units and the retainer component(s) possess a CTE which is less than or equal to that of the fuel cell units, during operation of a fuel cell device incorporating a tubular SOFC assembly herein, thermal expansion of the current collector(s), constrained as they are by the retainer component(s), causes a compressive force to be exerted against the electrical contact surfaces of the associated electrode components of the fuel cell units thus resisting any tendency of the current collectors to detach or pull away from the electrical contact surfaces of the electrodes. It is this compressive force that maintains substantially full electrical contact of the current collectors with their associated electrode elements even after numerous on-off cycles of fuel cell operation.

In general, the CTE for the current collector(s) can range from 1.6-2% at 800° C., that of the retainer(s) from 0.6-0.72% at 800° C. and that of the fuel cell units from 1-1.22% at 800° C.

The retainer component(s) of the tubular SOFC of the invention can be fabricated from any substantially electrically non-conductive material, e.g., any of numerous known and conventional electrically neutral ceramics such as alumina, zirconia-toughened zirconia, yttria tetragonal zirconia polycrystal, and the like, provided, of course, that the CTE of the retainer component(s) does not exceed that of the associated current collector component(s). The retainer component(s) can be formed by any of several known and conventional processes such as molding, combined molding and machining of green strength material followed by firing, lamination of sections of the green ceramic tape possessing die-cut or laser-cut cutouts followed by firing, and so forth.

FIGS. 2G, 2H and 2I illustrate another embodiment of tubular SOFC assembly according to the invention in which the fuel cell units are electrically connected in parallel. In FIG. 2G, fuel cell pair 230 is electrically connected anode-to-anode by shared current collector 201 at first end 231 as shown in FIG. 2I and in. FIG. 2H by shared current collector 201 cathode-to-cathode at second end 232 as also shown in FIG. 2I.

As further shown in FIG. 2I, retainers 241 and 242 disposed at end sections 243 and 244, respectively, of tubular SOFC assembly 240 are configured to retain these end sections and their shared current collectors in close-fitting relationship therewith, again, as in the case of tubular SOFC assembly 230 of FIG. 2D, to prevent or hinder any significant relative movement of electrical contact surfaces away from each other than would otherwise result in power-reducing ohmic losses.

Tubular SOFC assembly 300 shown in FIGS. 3A and 3C illustrates the electrical connection of fuel cell units 100 and shared current collectors 201 in alternating single-ended series. As shown in FIG. 3B, retainer 301 (and its mirror-image counterpart retainer 302) includes passageways 303 for retaining first end section 101 of each fuel cell unit 100 and adjacent recesses 304 for retaining shared current collectors 201 in close-fitting relationship with each other. Slot 305 adjacent to non-shared current collector 307 disposed within recess 306 of retainer 302 is electrically connected to lead 308 (FIG. 3C) and the latter to an external load (not shown).

FIGS. 4A, 4B and 4C illustrate embodiments of tubular SOFC assemblies herein featuring a single retainer disposed at one end of each fuel cell unit (assembly 400 of FIG. 4A), a single retainer disposed at an intermediate section of each fuel cell unit (assembly 410 of FIG. 4B) and three retainers, one at each end section and one at an intermediate section of each fuel cell unit (assembly 420 of FIG. 4C).

FIGS. 5A and 5C show a configuration of tubular SOFC assembly of the invention 500 in which convex surface 104 of one fuel cell unit 100 is oriented toward concave surface 105 of an adjacent fuel cell unit 100, with shared current collector 501 disposed therebetween. As shown in FIG. 5B, current collector 501 is defined by a curved parallelogram cross section. FIG. 5C further shows optional electrically conductive layer 502 interposed between outer cathode layer 107 and current collector 201.

FIGS. 6A, 6B and 6C illustrate another embodiment of tubular SOFC assembly of the invention 600 in which cathode air delivery tubes 601 are disposed within the annular spaces of current collectors 201. While cathode air tubes 601 need not extend beyond current collectors 201 and retainer 221 for their proper functioning in tubular SOFC assembly 600, it is generally preferred that they extend for at least half the length of adjacent fuel cells 100 and more preferably up to two-thirds or so of this length at which point relatively cooler air will be discharged therefrom. In one variation of tubular SOFC assembly 600, instead of cathode air tubes 601 being disposed at the end of the assembly shown in FIGS. 6A-6C, the tubes are disposed at the other end of the assembly.

Cathode air tubes 601 introduce air, at ambient temperature when first drawn into tubular SOFC assembly 600 from the outside, into and through the assembly thereby providing oxygen for operation of the assembly. This air also functions as a cooling medium for maintaining the operating temperature of the assembly to within a desired range. Thus, the passage of air through cathode air tubes 601 can provide temperature control for the exhaust side of a fuel cell device incorporating tubular SOFC assembly 600, e.g. as in fuel cell device 900 of FIG. 9. This flow of ambient air can also be of benefit in cooling current collectors 201 thereby preventing or reducing the risk of their damage. Yet another advantage of the flow of air through cathode air tubes 601 is that it permits the denser packing of fuel cell units 100 in tubular SOFC assembly 600 than might otherwise be practical or desirable. Increasing the packing density of the fuel cell units reduces the volume of the assembly resulting in shorter thermal response times and increased thermal efficiency of a fuel cell device incorporating the assembly.

FIGS. 7A-7I illustrate in cross section a variety of fuel cell unit-shared current collector(s) configurations in accordance with the invention.

The number of fuel cell units in tubular SOFC assembly of this invention can vary from a minimum of two up to any desired number, with due consideration being given to cost, suitability for manufacture and/or other practical concerns, and can be arranged in any desired way or pattern, e.g., in pairs, in triplets, in quadruplets, etc., in a single row, in multiple rows, and so forth. Similarly, the shapes of the fuel cell units, current collectors and retainer and their sizes can vary widely provided, of course, functional requirements are satisfactorily met.

In FIGS. 8A and 8B, fuel cell device 800 incorporating tubular SOFC assembly 890 of this invention is shown without its full enclosure in order to better show its internal organization. Fuel cell device 800 includes a first blower system 810 which provides a flow of anode air that mixes with a gaseous fuel, e.g. gaseous hydrocarbon(s), vaporized liquid hydrocarbon(s) or alcohol(s), introduced through fuel port 895, the resulting fuel-air mixture then being introduced into fuel-air manifold 820 and from there into and through bore 109 of each fuel cell unit 100 of tubular SOFC assembly 890 where its contacts inner anode layer 106. Second blower system 830 provides a flow of cathode air to cathode air manifold 840 from which exits through outlets 850 to provide a source of oxygen for external cathode layer 107 of each tubular SOFC unit 100 of the assembly. The air entering cathode air manifold 840 gains heat from the hot combustion gases exiting tail burner 860 into heat exchanger 870. The dotted lines show the flow path of the heated air exiting outlets 850 of cathode air manifold 840, a direction which is generally transverse to the longitudinal axes of the fuel cell units of tubular SOFC assembly 890, through the assembly and into tail burner 860 where it provides oxygen to support combustion of unspent fuel present in the exhaust gas emerging from the fuel cell units into exhaust manifold 880 and from there into the tail burner. Finally, the hot combustion gases enter heat exchanger 870 where they serve to preheat incoming cathode air provided by second blower system 830 as previously indicated. Blower systems 810 and 830, which are of similar construction, and their operation are described in detail in copending, commonly assigned U.S. patent application Ser. No. 13/168,280, filed Jun. 24, 2011. Retainer components 891 and 892 of tubular SOFC assembly 890, shown in phantom outline, are disposed within the interior of, respectively, exhaust manifold 880 and fuel-air manifold 820 where they function as described above.

Figure 9:
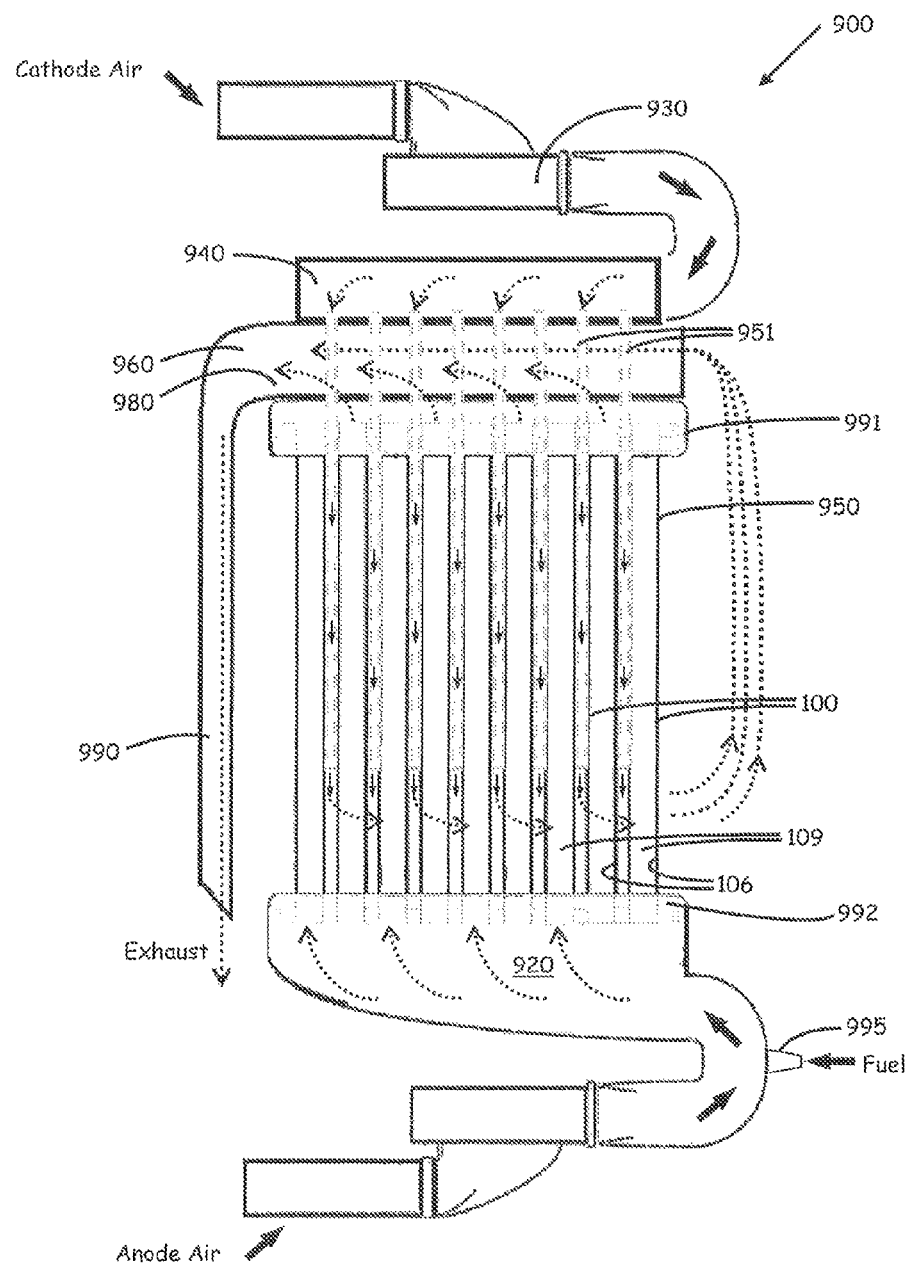
FIG. 9 is a top view, partly elevational and partly cross sectional, of a fuel cell device of the invention incorporating a cathode air tube-containing tubular SOFC assembly in accordance with the invention for providing air flow through the assembly in a path which initially is generally parallel to the longitudinal axes of the fuel cell units.

In FIG. 9, fuel cell device 900 incorporates a cathode air tube-containing tubular SOFC assembly 950, shown therein in phantom outline, much like that shown in FIGS. 6A-6C for providing a flow of cathode air initially in a path which is generally parallel to the longitudinal axes of fuel cell units 100. Fuel cell device 900 farther includes a first blower system 910 which provides a flow of anode air, subsequently mixed with fuel, e.g., one containing gaseous hydrocarbon(s), vaporized liquid hydrocarbon(s) or alcohol(s), introduced through fuel portal 895, the resulting fuel-air mixture then entering fuel-air manifold 920 and thereafter into and through bore 109 of each fuel cell unit 100 of tubular SOFC assembly 990 where it contacts inner anode layer 106. Second blower system 930 provides a flow of cathode air to cathode air manifold 940 and from there into each of cathode air tubes 951, shown in phantom outline, of tubular SOFT assembly 950. As the cathode air travels the length of the assembly as indicated by the arrows, it takes up heat from the fuel-air reaction occurring within fuel cell units 100. The heated air at its furthermost travel is then directed into exhaust manifold 980 where its remaining oxygen content supports combustion of unconsumed fuel emerging from fuel cell units 100. Finally, the hot combustion gases are discharged from fuel cell device 900 through exhaust conduit 990. Retainer components 991 and 992 of tubular SOFC assembly 950, shown in phantom outline, are positioned at opposite ends of the assembly where they function as previously described.

Figure 10A:
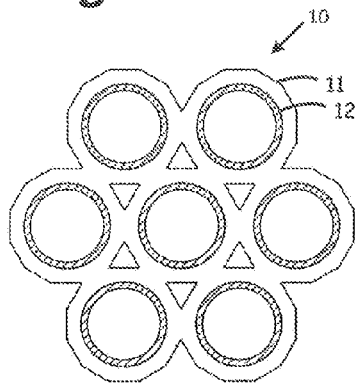
FIGS. 10A and 10B (Prior Art) are cross sectional views of a known type of tubular SOFC assembly, respectively, in its original (i.e., new) condition at ambient temperature (20° C.) and at its normal operating temperature of 600-850° C.
Figure 10B:
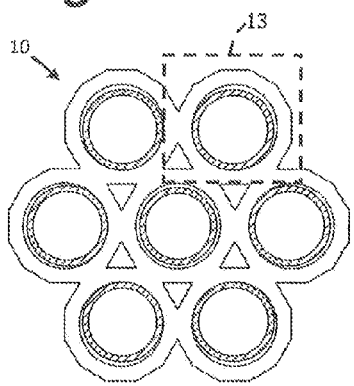
Figure 10C:
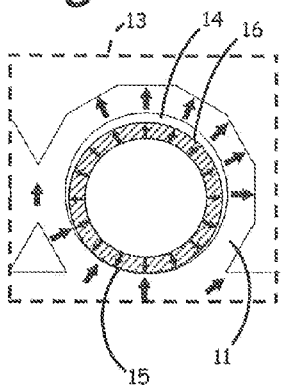
FIG. 10C (Prior Art) is an enlarged view of one of the fuel cell units of the tubular SOFC assembly of FIG. 10B showing the partial separation of electrical contact surfaces resulting from the mismatch in the coefficients of thermal expansion of the metallic current collector and its associated ceramic fuel cell unit.
Figure 11A:
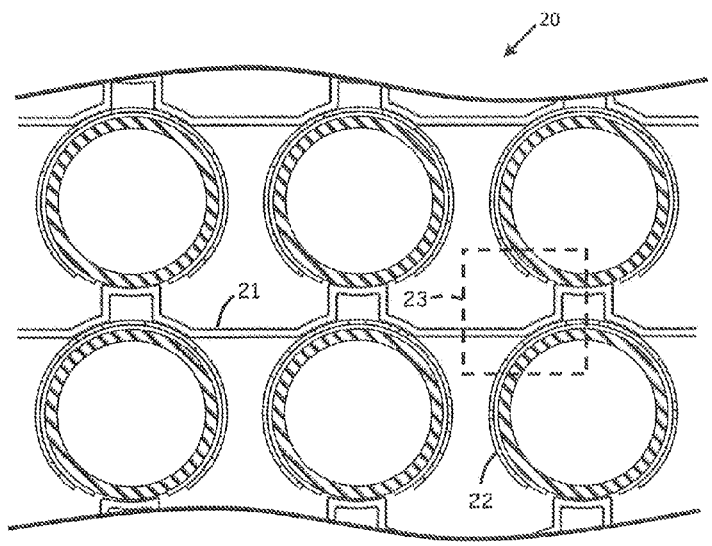
FIG. 11A (Prior Art) is a cross sectional view of a portion of tubular SOFC assembly of another known type in its original condition at ambient temperature (20° C.); and, FIG. 11B (Prior Art) is an enlarged view of one of the fuel cell units of the tubular SOFC assembly of FIG. 11A at its normal operating temperature of 600-850° C. showing the partial separation of electrical contact surfaces resulting from the mismatch in the coefficients of thermal expansion of the metallic current collector and its associated ceramic fuel cell unit.
Figure 11B:
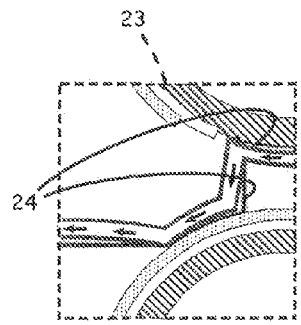

In contrast to the tubular SOFC assembly of this invention, known tubular SOFC assemblies lack a component which functions in a manner which is the same as or similar to that of the retainer(s) herein. By way of illustrating this difference and its effect on the operation of a fuel cell device, FIGS. 10A, 10B and 10C illustrate a tubular SOFC assembly representative of those described in U.S. Patent Application Publication 2008/0063916 and FIGS. 11A and 11B illustrate a tubular SOFC assembly representative of those described in U.S. Pat. No. 6,379,831.

In FIGS. 10A and 10B, tubular SOFC assembly 10 shown in cross section includes a single metallic current collector 1 shared by each ceramic fuel cell unit 12 in the assembly. In the original, i.e., new, condition and at ambient temperature, considered herein to be 20° C., there is complete uninterrupted contact between the electrical contact surfaces of current collector 11 and the conforming electrical contact surfaces of each fuel cell unit 12. However, and as shown in FIGS. 10B and 10C, at the normal operating temperature of tubular SOFC assembly 10 of 600-850° C., the differential, or mismatch, in the coefficients of thermal expansion of current collector 11 and fuel cell units 12 causes partial separation of the electrical contact surfaces of these components from each other, a separation which is shown in greater detail as gap 14 in enlarged portion 13 of FIG. 10C.

In FIG. 10C, the arrows show the general direction of thermal expansion of current collector 11 and fuel cell unit 12. While current collector 11 exerts a compressive force against side 15 of fuel cell unit 12, since the current collector is unconstrained in its expansion relative to the much lower expansion of fuel cell unit 12, it will tend to pull away from fuel cell unit 12 on the latter's opposite side 16 thereby creating gap 14. This partial separation, or gap 14, between electrical contact surfaces of current collector 11 and fuel cell unit 12 results in ohmic losses and accompanying power losses which tend to worsen as a fuel cell device incorporating, tubular SOFC assembly 10 undergoes and increasing number of on-off cycles. Since current collector component 11 lacks any significant elasticity, as the number of on-off cycles increases, current collector 11 returns less and less to its original geometry inexorably resulting in a still greater gap in the electrical contact surfaces and correspondingly greater ohmic/power losses. While this result can be offset or compensated by providing a larger fuel cell unit with an initial power output rating greater than its nominal rating, such a solution to the problem occasioned by thermal mismatch of current collector and fuel cell unit components is an economically undesirable one.

Tubular SOFC assembly 20 shown in cross section FIG. 11A and in enlarged portion 23 of FIG. 11B is yet another known type of tubular solid oxide fuel assembly in which the unconstrained thermal expansion of its metallic mesh current collector component 21 relative to that of its associated ceramic fuel cell component 2 at operating temperature (as shown by the arrows in FIG. 11B) results in the formation of gaps 24 in their electrical contact surfaces with consequent ohmic and power losses.

In accordance with the present invention, provision of at least one retainer component configured to maintain the current collector(s) and their associated fuel cell units in close-fitting relationship therewith constrains the expansion of the current collector(s) and by redirecting expansion forces against the electrical contact surfaces of the associated fuel cell unit, results in a compressive force applied to the entirety of the electrical contact surfaces thereby preventing the formation of a gap to which known tubular SOFC assemblies such as those discussed above are subject.

Although the invention has been described in detail for the purpose of illustration, it is understood that such detail is solely for that purpose, and variations can be made therein by those skilled in the art without departing from the spirit and scope of the invention which is defined in the claims.

The invention claimed is:

1. A tubular solid oxide fuel cell assembly which comprises:
   a) at least two axially elongate tubular solid oxide fuel cell units sharing at least one external current collector, each fuel cell unit comprising:
      i) first and second end sections and an intermediate section therebetween, and
      ii) an inner electrode layer, an outer electrode layer and an electrolyte layer therebetween;
   b) at least one external, shared current collector in electrical contact with an outer electrode layer of the at least two fuel cell units, the shared current collector possessing a coefficient of thermal expansion greater than that of the fuel cell units, the shared current collector and each outer electrode layer in electrical contact therewith possessing substantially conforming electrical contact surfaces; and,
   c) at least one retainer configured to retain at least one section of at least two fuel cell units and at least a portion of the shared current collector in close-fitting relationship therewith, the coefficient of thermal expansion of the retainer being less than or equal to that of the shared current collector, the portion of the shared current collector retained within the retainer when thermally expanded placing the outer electrode layer of each fuel cell unit under compression.

2. The tubular solid oxide fuel cell assembly of claim 1 wherein the inner electrode layer is an anode and the outer electrode layer is a cathode.

3. The tubular solid oxide fuel cell assembly of claim 1 further comprising an electrically conductive layer in electrical contact with the outer electrode layer, wherein when present, the electrically conductive layer is in electrical contact with the shared current collector.

4. The tubular solid oxide fuel cell assembly of claim 1 wherein the shared current collector is shared only by adjacent fuel cell units.

5. The tubular solid oxide fuel cell assembly of claim 1 wherein the shared current collector is shared by adjacent and non-adjacent fuel cell units.

6. The tubular solid oxide fuel cell assembly of claim 1 wherein the shared current collector is shared by all of the fuel cell units.

7. The tubular solid oxide fuel cell assembly of claim 1 wherein the shared current collector possesses at least two electrical contact surfaces, the corresponding conforming surface of the outer electrode layer of each fuel cell unit in electrical contact therewith being straight or curved.

8. The tubular solid oxide fuel cell assembly of claim 7 wherein the shared current collector possesses at least two convex electrical contact surfaces, the corresponding conforming surface of the outer electrode layer of each fuel cell unit in electrical contact therewith being concave.

9. The tubular solid oxide fuel cell assembly of claim 7 wherein the shared current collector possesses at least two concave electrical contact surfaces, the corresponding conforming surfaces of the outer electrode layer of each fuel cell unit in electrical contact therewith being convex.

10. The tubular solid oxide fuel cell assembly of claim 7 wherein the shared current collector possesses at least two electrical contact surfaces, one such surface being convex and in electrical contact with a concave electrical contact surface of an outer electrode layer in one of the fuel cell units and the other such surface being concave and in electrical contact with a convex electrical contact surface of an outer electrode layer in an adjacent fuel cell unit.

11. The tubular solid oxide fuel cell assembly of claim 1 comprising two external, shared current collectors, electrical contact surfaces of one of the current collectors being in electrical contact with an electrode surface at the first end section of each fuel cell unit, and electrical contact surfaces of the other current collector being in electrical contact with an electrode surface at the second end section of each fuel cell unit, there being two retainers, one retainer for retaining the first end section of each fuel cell unit and their shared current collector and the other retainer for retaining the second end section of each fuel cell unit and their shared current collector.

12. The tubular solid oxide fuel cell assembly of claim 1 wherein the retainer comprises a passageway for retaining a section of each fuel cell unit and an adjacent recess or passageway for retaining at least a portion of each shared current collector.

13. The tubular solid oxide fuel cell assembly of claim 11 wherein each retainer comprises a passageway for retaining a section of each tubular solid oxide fuel cell and an adjacent recess or passageway for retaining at least a portion of each shared current collector.

14. The tubular solid oxide fuel cell assembly of claim 4 wherein a cross section of the shared current collector at a section which is in electrical contact with the outer electrode layer of the adjacent fuel cell units is defined by a circle, an ellipse, an alternating series of concave and convex curves or a curved parallelogram.

15. The tubular solid oxide fuel cell assembly of claim 4 wherein a cross section of a fuel cell unit at a surface which is other than a surface in electrical contact with the shared current collector is defined by a circle, an ellipse or an alternating series of concave and convex curves.

16. The tubular solid oxide fuel cell assembly of claim 15 wherein a cross section of adjacent fuel cell units is defined by a series of two convex curves alternating with two concave curves, a convex curve of the cross section of one fuel cell unit being oriented toward a substantially conforming concave curve of the cross section of an adjacent fuel cell unit, the shared current collector having a cross section defined by a curved parallelogram.

17. The tubular solid oxide fuel cell assembly of claim 1 wherein the junctures of different surfaces are rounded in order to diffuse or reduce thermally induced mechanical stresses thereat.

18. The tubular solid oxide fuel cell assembly of claim 1 wherein the shared current collector is an apertured tube allowing gas to circulate therethrough and contact the outer electrode layer.

19. The tubular solid oxide fuel cell assembly of claim 1 wherein the shared current collector possesses a passageway therethrough and a cathode air tube disposed within the passageway.

20. A fuel cell device incorporating the tubular solid oxide fuel cell assembly of claim 1.

21. The tubular solid oxide fuel cell assembly of claim 1, wherein the at least one shared current collector comprises a portion of its electrical contact surface in electrical contact with the inner electrode layer of one of the fuel cell units and another portion of its electrical contact surface in electrical contact with the outer electrode layer of an adjacent fuel cell unit.

22. The tubular solid oxide fuel cell assembly of claim 1, which comprises at least two shared current collectors, one of the shared current collectors being in electrical contact with the inner electrode layer of at least two adjacent fuel cell units and the other shared current collector being in electrical contact with the outer electrode layer of the at least two adjacent fuel cell units.

\* \* \* \* \*